United States Patent [19]
Long et al.

[11] Patent Number: 5,665,274
[45] Date of Patent: Sep. 9, 1997

[54] ELECTRICALLY CONDUCTIVE BLACK SILICONE PAINT HAVING SPACECRAFT APPLICATIONS

[75] Inventors: Lynn E. Long, Manhattan Beach; Martin R. Gallardo, Sylmar, both of Calif.

[73] Assignee: Hughes Aircraft Company, Los Angeles, Calif.

[21] Appl. No.: 577,981

[22] Filed: Dec. 22, 1995

[51] Int. Cl.$^6$ .................. H01B 1/24; B64G 1/14; C08K 3/04

[52] U.S. Cl. .................. 252/511; 252/502; 524/496; 528/10; 244/1 A; 244/158 A; 244/158 R; 428/357; 428/922

[58] Field of Search .................. 252/502, 511; 524/496; 528/10, 12; 244/1 A, 158 A, 158 R; 428/357, 422

[56] References Cited

U.S. PATENT DOCUMENTS

| | | | |
|---|---|---|---|
| 4,705,646 | 11/1987 | DuPont et al. | 252/511 |
| 4,957,723 | 9/1990 | Nishino | 423/449 |
| 5,382,384 | 1/1995 | Baigrie et al. | 252/511 |

*Primary Examiner*—Paul Lieberman
*Assistant Examiner*—Mark Koper
*Attorney, Agent, or Firm*—Elizabeth E. Leitereg; Terje Gudmestad; Wanda K. Denson-Low

[57] ABSTRACT

A spacecraft includes a spacecraft element, such as a deployable antenna, and a black paint on the spacecraft element. The paint has a composition of 100 parts by weight of a methyl phenyl silicone-based polymer, and from about 1.35 to about 3.5 parts by weight of an electrically conductive carbon pigment having a porous, sponge-like structure. The paint is applied by mixing these constituents with a solvent such as naphtha or xylene in an amount sufficient to permit the paint to be applied by a selected technique such as brushing or spraying.

16 Claims, 3 Drawing Sheets

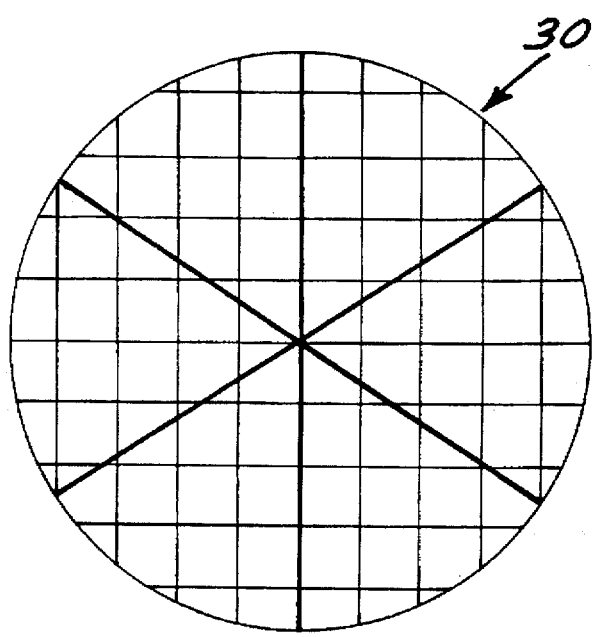
FIG. 6
FIG. 8
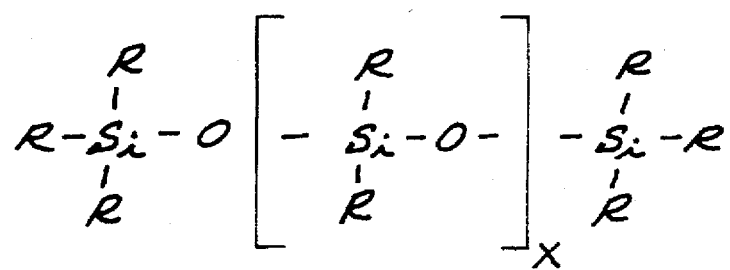

ELECTRICALLY CONDUCTIVE BLACK SILICONE PAINT HAVING SPACECRAFT APPLICATIONS

BACKGROUND OF THE INVENTION

This invention relates to thermal control paints, and, more particularly, to a black paint useful in spacecraft applications.

Spacecraft are subjected to a wide range of thermal environments during service. Heat radiates rapidly into free space to cool the spacecraft, but it can be heated intensively in direct sunlight. Active and passive temperature control techniques are used to control the interior temperature of the spacecraft, which contains persons or sensitive instruments. Active temperature control usually involves machinery or electrical devices, such as electrical heaters and air conditioners.

An established approach to passive temperature control is the use of surface coatings, typically termed paints, on the external surface of the spacecraft. A white paint, for example, has a low solar absorptance, while a black paint has a high emittance. The selective application of such paints to various elements of the spacecraft structure greatly aids in controlling its temperature. The present invention deals with a black paint that is useful in spacecraft temperature control applications.

A spacecraft paint, whatever its color, should exhibit additional characteristics for some spacecraft applications. The paint must be stable during long-term service in a space environment. It must be resistant to abrasion and other types of mechanical damage due to micrometeorite impacts. For some elements of the spacecraft, particularly those which deform such as a deployable antenna, a flexible blanket, or the like, the paint must also be tough and flexible so that it does not crack and flake away as it is flexed due to mechanical or thermal strains.

In most cases, the paint must dissipate electrostatic charges that develop on the external surface of the spacecraft. The charges would otherwise accumulate to cause arcing and possible damage to, or interference with, sensitive electronic equipment on or in the spacecraft. In order to dissipate electrostatic charge, the paint must be somewhat electrically conductive, with a surface resistivity on the order of about $10^9$ ohms per square or less.

There are black, electrostatic-dissipative paints known for spacecraft use. The available paints are satisfactory in applications where the temperature of the substrate to which they are applied remains relatively constant. However, none of these paints is fully satisfactory in applications where the substrate experiences a wide range of temperatures during service (e.g., $-150°$ C. to $200°$ C.). Examples of spacecraft components experiencing such wide temperature ranges include flexible substrates such as mesh fabrics used in antennas. In particular, paints that are otherwise reasonably satisfactory in such applications tend to exhibit instability in the electrical resistivity during prolonged exposure in space. The result is that, after a period of time, the resistivity tends to increase so that the electrostatic charge is no longer dissipated, surface charges accumulate, and interference or damage may result.

There is a need for an improved black thermal-control paint, which would be of particular value in spacecraft applications which involve large temperature ranges, especially flexible mesh fabrics. The present invention fulfills this need, and further provides related advantages.

SUMMARY OF THE INVENTION

The present invention provides a black paint, articles covered with the paint, and methods for preparation and application of the paint. The black paint exhibits high thermal emittance due to its black color. The paint has a satisfactorily low surface resistivity to dissipate electrical charges, and the satisfactory surface resistivity is maintained (with relatively minor, acceptable changes) over extended periods of time. The paint exhibits excellent mechanical properties, including a high degree of flexibility that makes it suitable for use on structures that flex, bend, or deploy during service.

In accordance with the invention, a paint comprises a mixture of 100 parts by weight (pbw) of a methyl phenyl silicone-based polymer, and from about 1.35 to about 3.5 parts by weight, most preferably from about 1.75 parts by weight to about 2.5 parts by weight, of an electrically conductive carbon pigment having a porous, sponge-like structure. To apply the paint, this mixture is dissolved into a suitable solvent in an amount sufficient to permit application to a surface by a selected technique. As used herein, "solvent" refers to a solvent for the polymer. The carbon pigment is not dissolved, but instead is carried in the polymer-containing solution. For example, for brushing, roller application, or spraying, the formulation is mixed with from about 50 to about 135 parts by weight of a solvent such as naphtha or xylene, and then applied. The solvent evaporates during drying, leaving the mixture of polymer and carbon pigment. During the drying operation, the polymer cures by reaction with the moisture in the air.

The electrically conductive carbon pigment is preferably formed by the agglomeration of carbon particles into a sponge-like structure having a high degree of porosity and a high specific surface area. The specific surface area is on the order of from about 800 to about 1000 square meters per gram, much higher than that of typical graphite pigments used in some other black, conductive paints. The sponge-like structure extends the carbon material over a large volume, as compared with using a compact form of carbon such as compactly solid, essentially nonporous carbon particles. As a result, the electrically conductive carbon phase has a much greater conductivity in the polymer phase than would otherwise be expected based upon its relatively low constituent fraction. The carbon pigment with a sponge-like structure also has less tendency to gravity settle during mixing and application, improving the consistency of the results.

The polymer into which the carbon pigment is mixed is a silicone polymer, most preferably a methyl phenyl silicone-based polymer selected for its low glass transition temperature. The polymer optionally contains a silica flatting agent, a crosslinker, a catalyst, an adhesion promoter, and additional solvent.

The present invention produces a black paint that is readily formulated and applied, and which has a sufficiently high electrical conductivity to dissipate electrostatic charge. The black paint has excellent mechanical properties over a wide temperature range, including good flexibility so that it can be used on flexible, deployable structures and in regions subjected to thermal cycling. The black paint of the invention is suitable for use on substrates that experience wide temperature ranges during service. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 6 is a perspective view of the spacecraft element of FIG. 5, in a second position;

FIG. 8 is a representation of the polymer used in the matrix formulation of the black paint.

DETAILED DESCRIPTION OF THE INVENTION

Figure 1:
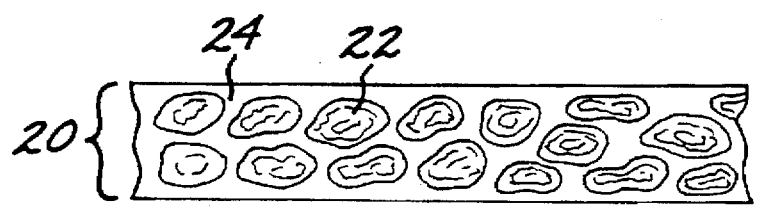
FIG. 1 is a side elevational view of a paint layer according to the invention.

FIG. 1 illustrates a paint layer 20 prepared according to the invention. The paint layer comprises electrically conductive carbon pigment particles 22 mixed with a matrix 24. Before drying, the matrix 24 is a polymer-mix formulation dissolved in a solvent. After drying, the matrix 24 is the largely solvent-free polymer-mix formulation.

Figure 2:
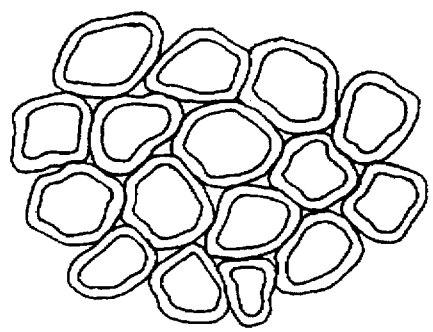
FIG. 2 is an enlarged perspective view of a carbon pigment particle used in the paint layer of FIG. 1.

The carbon pigment provides the black color of the paint, and also is the source of its sufficient electrical conductivity to dissipate electrostatic charges. The carbon pigment particles 22 have a porous, sponge-like structure, as illustrated in FIG. 2. Such particles are known and are available commercially. A preferred such carbon pigment particle material is Printex XE2 carbon pigment, available from Degussa Corp, Ridgefield Park, N.J. In general, such particles are prepared by the combustion or thermal decomposition of hydrocarbon compounds such as those found in petroleum, liquid coal tar hydrocarbons, natural gas, and acetylene. Such particles have a specific surface area of at least about 500 square meters per gram, preferably from about 800 to about 1000 square meters per gram, and most preferably about 1000 square meters per gram. This morphology is to be contrasted with that of conventional graphite particles used in prior electrically conductive black paint formulations, as illustrated for Micro 280 graphite particles in FIG. 3. Such graphite particles have a more dense, less open, substantially nonporous structure with a specific surface area that is typically on the order of about 13 square meters per gram, or about 1/75 that of the porous, sponge-like carbon pigment particles used in the paint of the invention.

Thus, for a selected weight of graphite or carbon, the sponge-like structure of the particles in FIG. 2 produces a larger particle size that extends over a larger effective volume. The result is a better, more certain interparticle charge flow path, with improved interparticle contact and connectivity, for any selected weight fraction of carbon particles that are present in the paint layer 20. The thickness of the sponge-structure walls is small in the sponge-like particles. However, because the dissipation of electrostatic charges involves only very small current flows, this small wall thickness and consequent small current flow area are fully operable and acceptable, and in fact desirable due to the excellent connectivity between the particles.

The electrically conductive carbon pigment particles are embedded in a dielectric silicone-based polymer matrix to form an electrically conductive composite paint. The interparticle connectivity, contacts, and pathways between the pigment particles form electrically conductive paths through the otherwise-dielectric polymer. When the pigment particles are relatively small and dense, a large weight fraction of the particles is necessary to achieve a specified level of electrical conductivity. On the other hand, when the particles have a porous, spongelike structure so that their sizes are large for their weight, the specified level of electrical conductivity can be achieved with a much smaller weight fraction of the carbon particles than would required for conventional, substantially nonporous, particles.

Additionally, as the polymer matrix dries and cures, internal stresses tend to separate the pigment particles. The porous, spongelike particles used with the present approach maintain their electrically conductive paths better than do conventional graphite particles in these circumstances. This improved interparticle contact is also important when the dried paint is deformed along with the structure, as in the case of a deployable mesh antenna covered with the black paint. The combination of the silicone polymer matrix, described next, and the use of the porous, spongelike carbon particles aids in retaining the electrical conductivity of the paint with greater certainty than is the case for prior black, electrically conductive paints. In the past, there have been significant failures in flexible antenna reflector structures designed for spacecraft use, traceable to a reduction in electrical conductivity of the paint as a result of deployment of the structure. The present flexible black paint overcomes such problems.

The black paint has improved mechanical flexibility due to its low carbon-to-polymer ratio. The mechanical flexibility is particularly important where the substrate to which the paint is applied is to flex or deform during service, as in the case of a deployable antenna. The paint must flex along with the substrate, or the paint will crack or peel. The low carbon-to-polymer ratio also improves the adherence of the paint to the substrate.

The matrix 24 contains a polymer-mix formulation and, prior to drying, a solvent. The polymer is preferably a silicone-based polymer, most preferably a methyl phenyl silicone-based polymer having a structure as shown in FIG. 8, where R is a methyl or a phenyl group, and x ranges from 1 to 2000 or more. The polymer is optionally but preferably mixed with additional constituents selected to improve the paint-forming properties and behavior of the paint. Such additional constituents include, for example, a flatting agent such as silica particles in an amount of about 5 percent by weight of the silicone polymer, a crosslinker such as Silbond TNPS in an amount of about 7.5 percent by weight, an adhesion promoter such as A1100 silane in an amount of about 1–2 percent by weight, and a catalyst such as dibutyltin dilaurate in an amount of about 0.5 to about 1.0 weight percent of the silicone polymer. Such a preferred matrix polymer-mix formulation is available from Nusil Technologies as Nusil CV-2-1146 silicone polymer.

Prior to drying, the matrix 24 also contains a solvent for the polymer-mix formulation. For the preferred polymer-mix formulation described in the preceding paragraph, the preferred solvent is naphtha, xylene, or a mixture thereof. During drying, the solvent evaporates and is no longer present.

Figure 3:
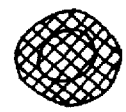
FIG. 3 is an enlarged perspective view of a graphite particle conventionally used in conductive black paint formulations.

For each 100 parts by weight of the preferred polymer-mix formulation, the porous, spongelike carbon pigment is present in an amount of from about 1.35 to about 3.5 parts by weight. If too little carbon pigment is present, the electrical conductivity of the final paint is insufficient to dissipate electrostatic charges (i.e., the paint has a surface resistivity of more than about $10^9$ ohms per square. If too much carbon pigment is present, the electrical resistivity of the final paint is too low (i.e., less than about $10^4$ ohms per square), so that the paint will tend to attenuate radio frequency signals and be subject to passive intermodulation problems. Additionally, if too much carbon pigment is present the mechanical properties of the paint are unacceptably low, adhesion of the paint to the substrate is reduced, and the flexibility of the paint is reduced below acceptable levels. Most preferably, from about 1.75 to about 2.5 parts by weight of the pigment is present for each 100 parts of the polymer-mix formulation. It has been observed that the finer the mesh fabric, the more carbon pigment is required within this range. (By contrast, about 15–18 or more parts by weight of the conventional graphite particles of the type illustrated in FIG. 3 is required to achieve acceptable electrical conductivity in conventional electrostatic-dissipative conductive black paints.)

The solvent is present to permit the constituents to be mixed together readily during preparation of the paint, and also to permit the paint to be applied to a substrate by a selected technique. To allow mixing, from about 50 to about 100 parts of solvent is present, for each 100 parts of the polymer-mix formulation and about 1.35 to 3.5 parts of the carbon pigment. Additional solvent may be added for application. For example, an additional 35 parts of solvent is typically added for application by spray painting. The amount of solvent is adjustable to permit proper application in any required situation.

Figure 4:
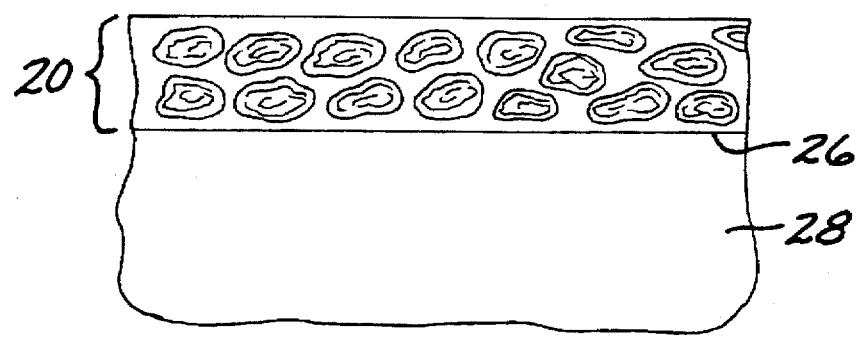
FIG. 4 is a side elevational view of the paint layer of FIG. 1, as applied to a substrate.

The paint layer 20 is typically applied to a surface 26 of a substrate 28, as shown in FIG. 4. The paint layer 20 is applied to the surface 26 with the solvent present and allowed to dry to evaporate the solvent and cure the polymer. The resulting solid paint layer adheres well to the surface 26.

Figure 5:
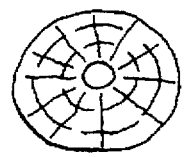
FIG. 5 is a perspective view of a spacecraft element in the form of a deployable antenna in a first position, and coated with the paint layer of FIG. 1.

The substrate 28 is preferably an element of a spacecraft, inasmuch as the black paint of the invention is particularly useful in space environments and in spacecraft applications. FIGS. 5 and 6 illustrate one such element, a deployable folding antenna 30 made of a mesh material. In a first position, shown in FIG. 5, the antenna 30 is folded to a compact form, similar to that of a folded umbrella, for launching of the spacecraft. In a second position, shown in FIG. 6, the antenna 30 is deployed to its open form, similar to that of an open umbrella, after the spacecraft reaches orbit or deep space.

The mesh elements that form the antenna 30 are coated with the black paint of the invention prior to launch, when the antenna is in the deployed position. The antenna is thereafter folded for storage at launch. After launch, the antenna is deployed. There may be other folding and deployment steps for testing of the antenna and for other reasons. The paint that coats the antenna must be sufficiently flexible to permit extensive deformation without cracking and peeling and, at the same time, to retain its electrical conductivity, even after the structure and the paint have been subjected to extremes in temperature that cause expansion and contraction. The paint discussed herein has such flexibility.

Figure 7:
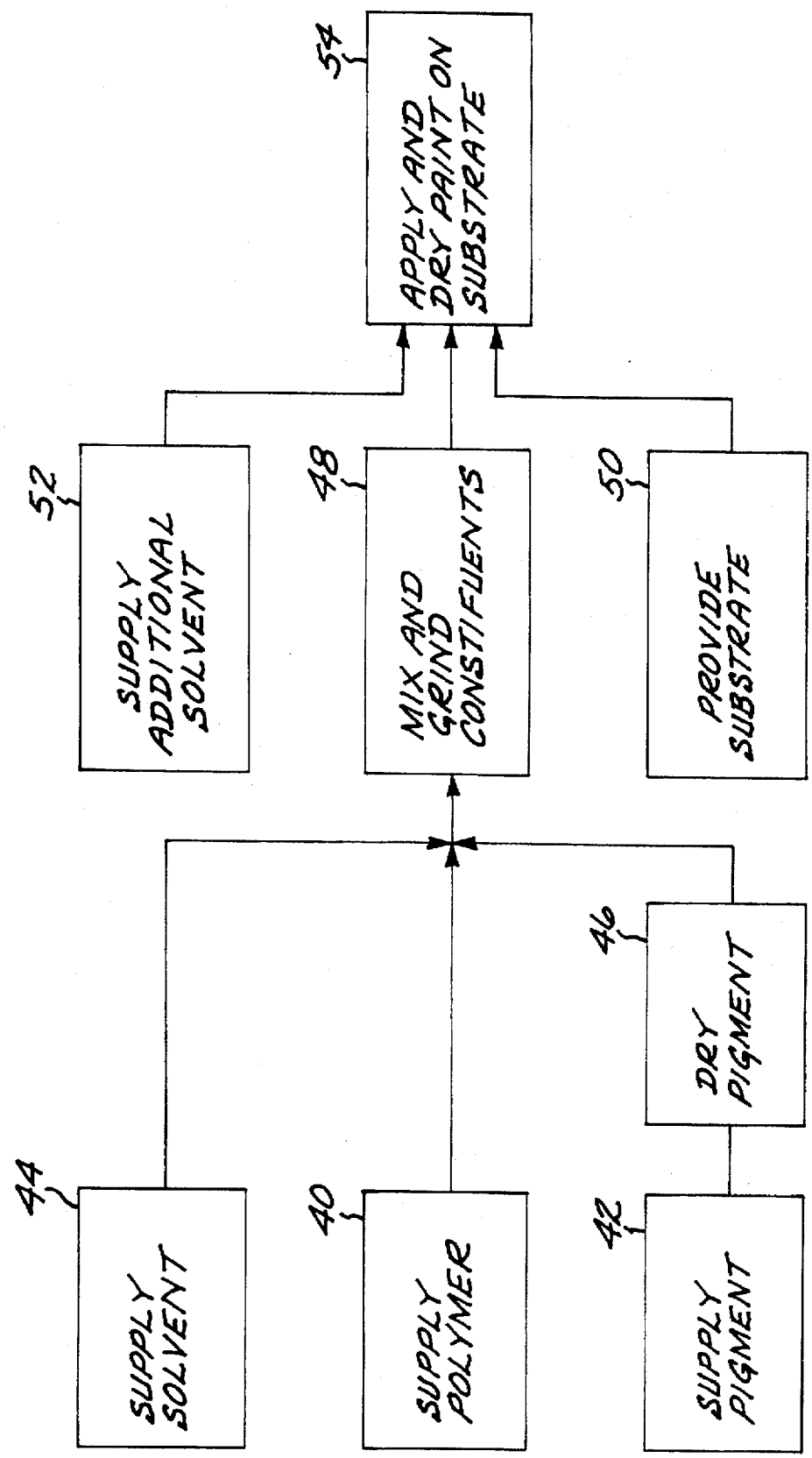
FIG. 7 is a block diagram of a method for the preparation of a black paint according to the invention and the painting of a substrate.

FIG. 7 illustrates a procedure for preparation and application of the black paint. The polymer-mix formulation is provided, numeral 40, the carbon pigment particles are provided, numeral 42, and the solvent required for paint mixing is provided, numeral 44. The pigment is dried in an oven for 2 hours in air at 250° F., numeral 46. These constituents are mixed and ground together, numeral 48. To accomplish this step 48, the three constituents are placed into a closed ceramic jar with a ceramic grinding media. The ceramic jar is placed onto a mechanical roller mill and ground until the pigment reaches a Hegman grind of at least 7, which typically requires about three hours of grinding.

The substrate is provided, numeral 50. Optionally, additional solvent is provided, numeral 52. No additional solvent is required for application by a blading, rolling, or brushing approach. About 35 parts by weight of additional solvent is typically required for spray application. The paint is applied by the selected technique and allowed to dry at ambient temperature, numeral 54. The thickness of the paint layer 20 is typically about 0.001–0.002 inches after drying. It is preferred to apply additional layers of about this thickness in order to build up a thicker layer if such a thicker layer is desired, with intermediate drying of each layer before the next layer is applied.

A number of test examples were prepared to evaluate variations in the paint composition. The following examples illustrate aspects of the invention, and should not be taken as limiting of the invention in any respect.

EXAMPLE 1

A paint formulation of 100 parts by weight CV-2-1146, 8 parts by weight of Printex XE2, and 310.5 parts by weight of naphtha was prepared, coated onto a kapton polyimide substrate to a dried thickness of 0.001–0.002 inches by blade drawdown, and dried. The surface resistivity was $7 \times 10^3$ ohms per square, judged to be too low for spacecraft applications. The paint was observed to be too dry and had poor adhesion.

EXAMPLE 2

A paint formulation of 100 parts by weight CV-2-1146, 1.5 parts by weight of Printex XE2, and 59.9 parts by weight of naphtha was prepared, coated onto a kapton substrate, and dried. Several different coating techniques were used.

In the first technique, the paint was applied by blade drawdown to an as-dried thickness of 0.0006–0.001 inches. The surface resistivity was $2 \times 10^7$ ohms per square, judged to be acceptable for spacecraft applications. The paint had good adhesion and flexibility, and a 60° gloss of 0.7.

In the second technique, the paint was applied by blade drawdown to an as-dried thickness of 0.0011 inches. The surface resistivity was $5 \times 10^6$ ohms per square, judged to be acceptable for spacecraft applications. The paint had good adhesion and flexibility, and a 60° gloss of 0.7.

In the third technique, the paint was applied by spray gun with two coats. The surface resistivity was $1.0 \times 10^6$ ohms per square, judged to be acceptable for spacecraft applications. The paint had good adhesion and flexibility, and a 60° gloss of 0.7.

In the fourth technique, the paint was applied by spray gun with four coats. The surface resistivity was $5 \times 10^5$ ohms per square, judged to be acceptable for spacecraft applications. The paint had good adhesion and flexibility, and a 60° gloss of 0.7.

In the fifth technique, the paint was applied by brush with two coats. The surface resistivity was $1.0 \times 10^6$ ohms per square, judged to be acceptable for spacecraft applications. The paint had good adhesion and flexibility, and a 60° gloss of 0.7.

EXAMPLE 3

A paint formulation of 100 parts by weight CV-2-1146, 1.5 parts by weight of Printex XE2, 5.0 parts by weight TS100 silica, and 116 parts by weight of naphtha was prepared, coated onto a kapton substrate to an as-dried thickness of 0.001 inch by blade drawdown, and dried. The surface resistivity was $1.8 \times 10^8$ ohms per square, judged to be acceptable for spacecraft applications. The as-dried paint had a dry surface, good adhesion and flexibility, and a 60° gloss of 0.2.

EXAMPLE 4

A paint formulation of 100 parts by weight CV-2-1146, 1.25 parts by weight of Printex XE2, and 49.2 parts by weight of naphtha was prepared, coated onto a kapton substrate to an as-dried thickness of 0.001 inch by blade drawdown, and dried. The surface resistivity was $10^9$–$10^{11}$ ohms per square, judged to be unacceptable for spacecraft applications. The as-dried paint had good adhesion and flexibility.

The same formulation was applied by brush to a thickness of 0.010 inches. The dried paint had a surface resistivity of $10^7$–$10^8$ ohms per square, acceptable for spacecraft applications, and had good adhesion and flexibility.

This formulation would be acceptable if applied by brush, but not by blade drawdown, to the indicated thicknesses. It is not a preferred formulation, because a mistake could be made in applying the paint by a technique which would result in an unacceptable resistivity.

EXAMPLE 5

A paint formulation of 100 parts by weight CV-2-1146, 0.85 parts by weight of Printex XE2, and 33.1 parts by weight of naphtha was prepared, coated onto a kapton substrate to an as-dried thickness of 0.001 inch by blade drawdown, and dried. The surface resistivity was $8.0 \times 10^{11}$ ohms per square, judged to be unacceptable for spacecraft applications. The as-dried paint had good adhesion and flexibility, and a 60° gloss of 1.3.

EXAMPLE 6

A paint formulation of 100 parts by weight CV-2-1146, 2.1 parts by weight of Printex XE2, 3.0 parts by weight of TS100 silica, and 91.4 parts by weight of naphtha was prepared, coated onto a kapton substrate by blade drawdown to a thickness of about 0.001 inch, and dried. The surface resistivity was $1.5 \times 10^5$ ohms per square, judged to be acceptable for spacecraft applications. The as-dried paint was dry, had good adhesion and flexibility, and a 60° gloss of 0.2.

EXAMPLE 7

A paint formulation of 100 parts by weight CV-2-1146, 1.85 parts by weight of Printex XE2, 2.7 parts by weight of TS100 silica, and 127 parts by weight of naphtha was prepared, coated onto a kapton substrate by blade drawdom to a thickness of about 0.001 inch, and dried. The surface resistivity was $5 \times 10^5$ ohms per square, judged to be acceptable for spacecraft applications. The as-dried paint was dry, had good adhesion and marginal flexibility, and a 60° gloss of 0.2.

EXAMPLE 8

A paint formulation of 100 parts by weight CV-2-1146, 1.85 parts by weight of Printex XE2, 1.92 parts by weight of TS100 silica, and 127 parts by weight of naphtha was prepared, coated onto a kapton substrate by blade drawdown to a thickness of about 0.001 inch, and dried. The surface resistivity was $2.5 \times 10^5$ ohms per square, judged to be acceptable for spacecraft applications. The as-dried paint was dry, had good adhesion and flexibility, and a 60° gloss of 0.2.

EXAMPLE 9

A paint formulation of 100 parts by weight CV-2-1146, 1.75 parts by weight of Printex XE2, and 94.6 parts by weight of naphtha was prepared, coated onto a kapton substrate by blade drawdown to a thickness of about 0.001 inch, and dried. The surface resistivity was $3.0 \times 10^5$ ohms per square, judged to be acceptable for spacecraft applications. The as-dried paint was dry and had good adhesion and flexibility, and was readily sprayed as well.

EXAMPLE 10

The formulation of Example 2 was coated onto a piece of polyimide plastic by spray to a thickness of 0.001 inch. The paint was readily applied by spraying. The surface resistivity was $1.5 \times 10^6$ ohms per square, judged to be acceptable for spacecraft applications. The as-dried paint had good adhesion and flexibility.

EXAMPLE 11

The formulation of Example 2 was coated onto a piece of mesh. The surface resistivity was $2 \times 10^7$ ohms per square, judged to be acceptable for spacecraft applications. The as-dried paint had good adhesion and flexibility.

EXAMPLE 12

The formulation of Example 2 was coated onto a piece of multistrand mesh. The surface resistivity was $5 \times 10^7$ ohms per square, judged to be acceptable for spacecraft applications. The as-dried paint had good adhesion and flexibility.

EXAMPLE 13

The formulation of Example 2 was coated onto a piece of multistrand mesh. The surface resistivity was $6 \times 10^7$ ohms per square, judged to be acceptable for spacecraft applications. The as-dried paint had good adhesion and flexibility.

The coating onto mesh was repeated for two other pieces using several different application techniques. The resulting surface resistivities were between $5 \times 10^7$ and $2 \times 10^8$ ohms per square, judged to be acceptable for spacecraft applications. The as-dried paint had good adhesion and flexibility in each case.

EXAMPLE 14

The formulation of Example 8 was coated onto a piece of mesh by spray and rolling techniques. The surface resistivity ranged between $5 \times 10^5$ and $3 \times 10^6$ ohms per square, judged to be acceptable for spacecraft applications. The as-dried paint had good adhesion and flexibility in each case.

EXAMPLE 15

A paint formulation of 100 parts by weight CV-2-1146, 1.5 parts by weight of Printex XE2, and 59.9 parts by weight of naphtha was prepared, coated onto a polyimide substrate by spraying, and dried to a thickness of about 0.001 inch. The surface resistivity was $5 \times 10^6$ ohms per square.

The coated substrate was thermally cycled between −90° F. and +225° F. After 47 cycles, the surface resistivity was $3 \times 10^7$ ohms per square. After 79 cycles, the surface resistivity was $3 \times 10^7$ ohms per square. After 192 cycles, the surface resistivity was 2.5×10⁷ ohms per square. All of these values are judged to be acceptable for spacecraft applications.

EXAMPLE 16

A paint formulation of 100 parts by weight CV-2-1146, 1.75 parts by weight of Printex XE2, and 94.6 parts by weight of naphtha was prepared, coated onto a polyimide substrate by spraying, and dried to a thickness of about 0.001 inch. The surface resistivity was $3 \times 10^5$ ohms per square.

The coated substrate was thermally cycled between −90° F. and +225° F. After 47 cycles, the surface resistivity was $7 \times 10^5$ ohms per square. After 79 cycles, the surface resistivity was $1 \times 10^6$ ohms per square. After 192 cycles, the surface resistivity was $1.2 \times 10^6$ ohms per square. All of these values are judged to be acceptable for spacecraft applications.

EXAMPLE 17

A paint formulation of 100 parts by weight CV-2-1146, 1.5 parts by weight of Printex XE2, and 59.9 parts by weight of naphtha was prepared, coated onto a polyimide substrate by spraying, and dried to a thickness of about 0.001 inch. The surface resistivity was $5 \times 10^6$ ohms per square.

The coated substrate was heated to a temperature of 225° F. in a vacuum chamber pumped to a vacuum of $10^{-5}$ Torr. After 40 hours, the surface resistivity was $7.5 \times 10^7$ ohms per square at 225° F. After 120 hours, the surface resistivity was $7.5 \times 10^7$ ohms per square at 225° F. After 120 cycles, the surface resistivity was $2.0 \times 10^7$ ohms per square at ambient temperature in vacuum. After 120 cycles, the surface resistivity was $2.8 \times 10^7$ ohms per square at ambient temperature and ambient pressure. All of these values are judged to be acceptable for spacecraft applications.

EXAMPLE 18

A paint formulation of 100 parts by weight CV-2-1146, 1.75 parts by weight of Printex XE2, and 94.6 parts by weight of naphtha was prepared, coated onto a polyimide substrate by spraying, and dried to a thickness of about 0.0005 inch. The surface resistivity was $1 \times 10^6$ ohms per square.

The coated substrate was heated to a temperature of 225° F. in a vacuum chamber pumped to a vacuum of $10^{-5}$ Torr. After 40 hours, the surface resistivity was $7.0 \times 10^7$ ohms per square at 225° F. After 120 hours, the surface resistivity was $6.5 \times 10^7$ ohms per square at 225° F. After 120 cycles, the surface resistivity was $5.0 \times 10^7$ ohms per square at ambient temperature in vacuum. After 120 cycles, the surface resistivity was $5.6 \times 10^7$ ohms per square at ambient temperature and ambient pressure. All of these values are judged to be acceptable for spacecraft applications.

Examples 15–18 demonstrate the operability of the black paint in conditions that simulate spacecraft service conditions.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A paint system comprising a mixture of:

100 parts by weight of a silicone-based polymer, and from about 1.35 to about 3.5 parts by weight of an electrically conductive carbon pigment having a porous, sponge-like structure and having a specific surface area of at least 500 m²/g.

2. The paint system of claim 1, further comprising a solvent.

3. The paint system of claim 1, further including from about 50 to about 135 parts by weight of a solvent for the polymer.

4. The paint system of claim 1, wherein the carbon pigment has a specific surface area of from about 800 to about 1000 square meters per gram.

5. The paint system of claim 1, wherein the carbon pigment has a specific surface area of about 1000 square meters per gram.

6. The paint system of claim 1, wherein the silicone-based polymer is a methyl phenyl silicone-based polymer.

7. The paint system of claim 1, further including a substrate to which the mixture is affixed.

8. The paint system of claim 7, wherein the substrate is a component of a spacecraft.

9. The paint system of claim 1, wherein the mixture has from about 1.75 to about 2.5 parts by weight of the electrically conductive carbon pigment.

10. A spacecraft, comprising:

a spacecraft element, and a paint on the spacecraft element, the paint comprising 100 parts by weight of a silicone-based polymer, and from about 1.35 to about 3.5 parts by weight of an electrically conductive carbon pigment having a porous, sponge-like structure and having a specific surface area of at least 500 m²/g.

11. The spacecraft of claim 10, wherein the spacecraft element is a deployable structure having a closed configuration and an open configuration.

12. The spacecraft of claim 10, wherein the spacecraft element is a deployable mesh antenna.

13. The spacecraft of claim 10, wherein the carbon pigment has a specific surface area of from about 800 to about 1000 square meters per gram.

14. The spacecraft of claim 10, wherein the carbon pigment has a specific surface area of about 1000 square meters per gram.

15. The spacecraft of claim 10, wherein the silicone-based polymer is a methyl phenyl silicone-based polymer.

16. The spacecraft of claim 10, wherein the paint has from about 1.75 to about 2.5 parts by weight of the electrically conductive carbon pigment.

* * * * *